United States Patent [19]

Yamaguchi

[11] Patent Number: 5,415,358
[45] Date of Patent: May 16, 1995

[54] FISHING REEL WITH RECIPROCATING CAM SHAFT MECHANISM

[75] Inventor: Nobuyuki Yamaguchi, Tokyo, Japan

[73] Assignee: Daiwa Seiko, Inc., Tokyo, Japan

[21] Appl. No.: 74,602

[22] Filed: Jun. 11, 1993

[30] Foreign Application Priority Data

Jun. 19, 1992 [JP] Japan .............................. 4-048742 U

[51] Int. Cl.⁶ ............................................. A01K 89/01
[52] U.S. Cl. .................................... 242/241; 242/311; 242/279
[58] Field of Search ........ 242/241, 242, 274, 279–281, 242/310, 311

[56] References Cited

U.S. PATENT DOCUMENTS

| | | | |
|---|---|---|---|
| 1,688,135 | 10/1928 | Case .................................... | 242/279 |
| 2,523,133 | 9/1950 | Maynes ............................... | 242/274 |
| 4,042,186 | 8/1977 | Moosberg ........................... | 242/279 |
| 4,226,387 | 10/1980 | Karlsson ......................... | 242/280 X |
| 4,747,560 | 5/1988 | Karlsson ......................... | 242/280 X |
| 4,773,611 | 9/1988 | Kaneko .............................. | 242/241 |
| 5,275,352 | 1/1994 | Sato ................................ | 242/310 X |

FOREIGN PATENT DOCUMENTS 59-16377 1/1984 Japan .

*Primary Examiner*—Daniel P. Stodola
*Assistant Examiner*—Michael R. Mansen
*Attorney, Agent, or Firm*—Longacre & White

[57] ABSTRACT

A fishing reel includes a guide sleeve which is disposed around the reciprocating cam shaft of the fishline flat winding mechanism of the reel. A support member includes arc-shaped support portions on which the inner surface of the sleeve is fitted at one end thereof, and fitted support portions fitted in a support hole of a body of the reel and having side surfaces flush with those of the former support portions. The sleeve is accurately and securely supported concentrically to the cam shaft by the support member and the reel body so that the slider can smoothly slide back and forth on the sleeve.

6 Claims, 5 Drawing Sheets

FISHING REEL WITH RECIPROCATING CAM SHAFT MECHANISM

BACKGROUND OF THE INVENTION

The present invention relates to an improved mechanism for flatly winding a fishline on a fishing reel through the action of a reciprocating cam shaft.

In a conventional fishing reel, a slider having a fishline guide portion is engaged in a reciprocating cam shaft and fitted on a guide sleeve disposed around the shaft, so that the slider can be reciprocated, as described in the Japan Utility Model Application (OPI) No. 16377/84 (the term "OPI" as used herein means an "unexamined published application").

Since the notched end portion of the guide sleeve of the conventional fishing reel is directly engaged in the engagement hole of the frame of the reel to support the sleeve, there are problems that it is difficult to support the sleeve so as to prevent the playing thereof to guide the slider on the sleeve to smoothly reciprocate the slider, and a resistance acts to the reciprocating cam shaft due to the torque of the sleeve so as to hinder the smooth rotation of the shaft.

SUMMARY OF THE INVENTION

The present invention was made in order to solve the above-mentioned problems. Accordingly, it is an object of the invention to provide a fishing reel in which a slider is guided on a guide sleeve so as to smoothly slide back and forth, and a reciprocating cam shaft is smoothly rotated.

In the fishing reel, the guide sleeve is disposed around the reciprocating cam shaft, which is rotated in conjunction with a handle shaft, and the slider is coupled to the cam shaft through engagement and fitted on the sleeve so that the slider can be reciprocated. The guide sleeve is supported by the body of the reel using a one-piece support member including integral arc-shaped support portions on which the inner surface of the sleeve is fitted at one end thereof, and integral fitted support portions fitted in the support hole of the body of the reel and having side surfaces flush with those of the former support portions. The fitted support portion has outer surfaces defining the outside diameter of the support member so that the outside diameter is larger than that of the sleeve to form a gap between the body and the sleeve when mounted thereto. If the reel is a spinning reel, the cam shaft reciprocates a spool shaft. If the reel has a spool shaft supported at both the ends thereof, the cam shaft reciprocates the fishline guide member of a fishline flat winding mechanism.

Since the guide sleeve of the fishing reel provided in accordance with the present invention is supported by the arc-shaped support portions of the support member on the inner surface of the sleeve at one end thereof and the fitted support portions of the member, which have the outer surfaces defining the outside diameter of the member so that the outside diameter is larger than that of the sleeve, are fitted in the body of the reel, the sleeve is accurately and securely supported by the support member and the body of the reel to guide the slider on the sleeve so-that the slider is smoothly slid back and forth thereon by the reciprocating cam shaft.

DETAILED DESCRIPTION OF THE PREFERRED EMBODIMENTS

Figure 1:
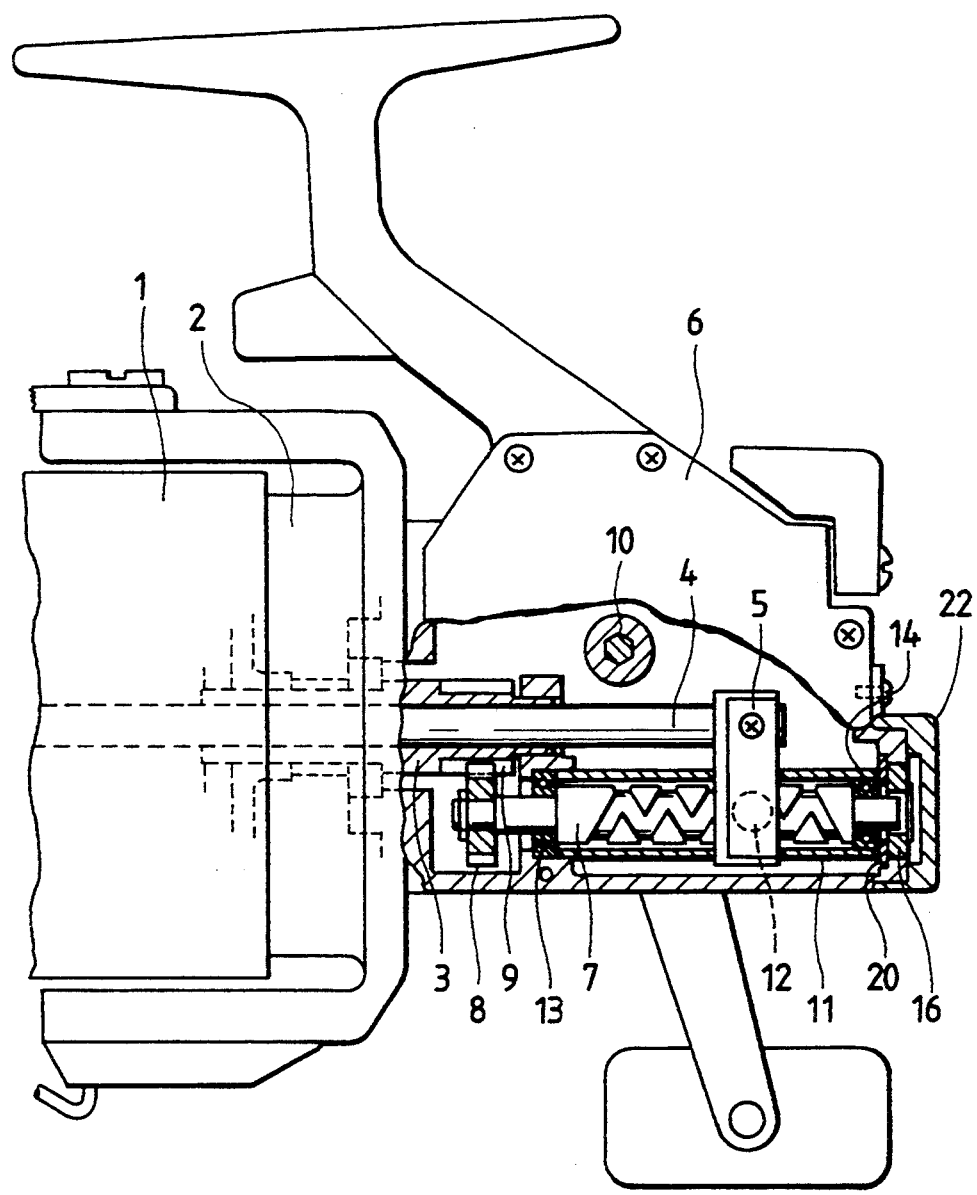
FIG. 1 is a cutaway side view of a fishing reel which is an embodiment of the present invention.
Figure 2:
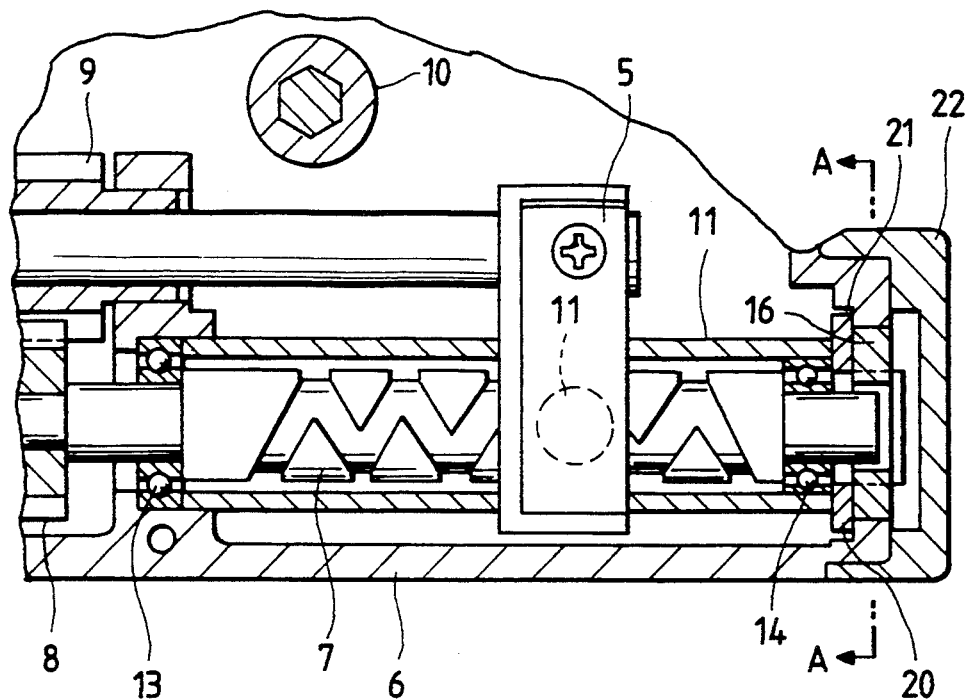
FIG. 2 is a longitudinally sectional view of a major part of the reel.
Figure 3:
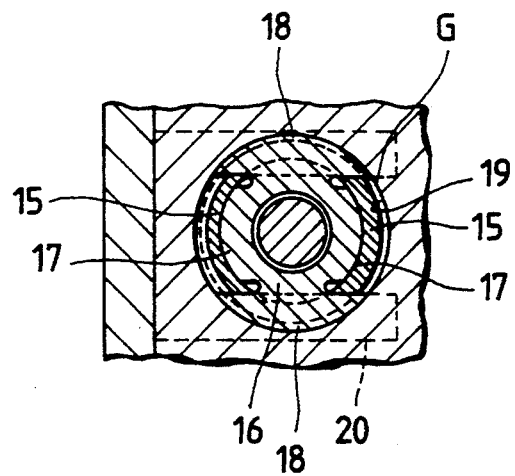
FIG. 3 is a sectional view of the part along lines A shown in FIG. 2.

Embodiments of the present invention are hereafter described with reference to the drawings attached hereto.

FIGS. 1, 2, 3 and 4 show a spinning reel which is one of the embodiments and is for fishing. The reel includes a spool 1, a rotor 2, a quill 3, a spool shaft 4, a slider 5, a reel body 6, a reciprocating cam shaft 7, a gear 8, a pinion 9, a drive gear not shown in the drawings, a handle shaft 10, a guide sleeve 11, an engagement pin 12, bearings 13 and 14, a support member 16, an engagement member 20, and a cover 22.

The spool 1 is secured to the spool shaft 4 at the front portion thereof. The spool shaft 4 is slidably fitted in the quill 3 which is for turning the rotor 2. The slider 5 is secured to the spool shaft 4 at the rear end thereof. The reciprocating cam shaft 7 is supported by the reel body 6, and extends in parallel with the spool shaft 4. The gear 8 is mounted on the cam shaft 7 at the front end thereof, and engaged with the pinion 9 formed on the quill 3 and engaged with the drive gear mounted on the handle shaft 10, so that the cam shaft can be rotated in conjunction with the handle shaft.

Figure 4:
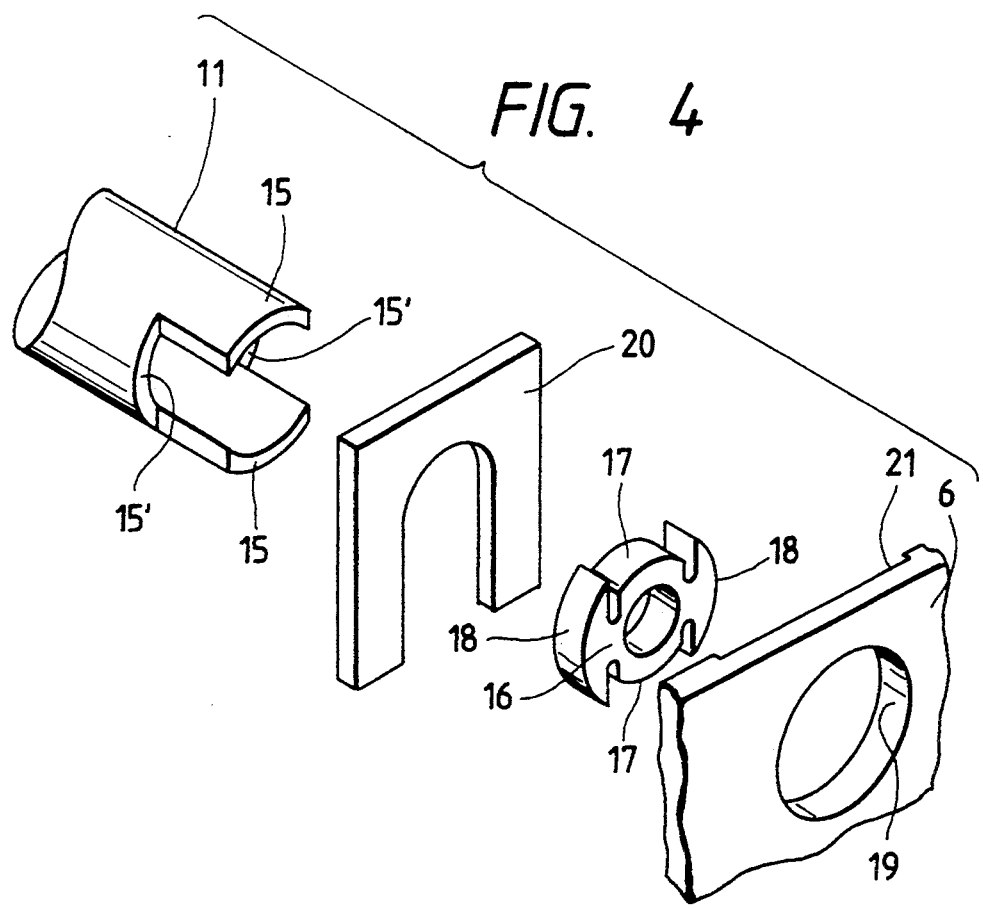
FIG. 4 is an exploded perspective view of the part.

The guide sleeve 11 is disposed around the reciprocating cam shaft 7. The slider 5 is slidably fitted on the sleeve 11. The engagement pin 12 is secured to the slider 5, and engaged in the reciprocating cam groove of the cam shaft 7. The sleeve 11 is supported at the front end thereof by the reel body 6, and has the front end located in contact with the bearing 13. The other bearing 14 is disposed between the cam shaft 7 and the sleeve 11 at the rear end thereof. The sleeve 11 includes supported portions 15 facing each other in the diametrical direction of the sleeve and each having an arc-shaped cross section, and notches 15' alternately adjoining the supported portions, as shown in FIG. 4. The inner surfaces of the supported portions 15 are located on the outer surfaces of the arc-shaped support portions 17 of the support member 16 so that the sleeve 11 is supported by the member.

The support member 16 includes the arc-shaped support portions 17, and fitted support portions 18 whose side surfaces are flush with those of the former support portions. The outside diameter of the support member 16, which extends from the outer surface of one of the fitted support portions 18 to that of the other, is larger than that of the sleeve 11. The fitted support portions 18 are fitted in the support hole 19 of the reel body 6. When the sleeve 11 is mounted on the reel body 6 through the support member 16, a gap G is formed between the outer surface of the sleeve 11 and the inner surface of the support hole 19. The engagement member 20 is fitted in the sliding opening 21 of the reel body 6 and on the inner surface of the support member 16, and engaged in the notches 15' of the sleeve 11 to prevent it from turning about the axis of the sleeve and moving in the axial direction thereof. The cover 22 is attached to the rear of the reel body 6 to cover the support member 16.

When the reciprocating cam shaft 7 is rotated through the drive gear, the pinion 9 and the gear 8 in conjunction with the handle shaft 10, the engagement pin 12 secured to the slider 5 secured to the spool shaft 4 is moved back and forth in the reciprocating cam groove of the cam shaft so that the slider slides back and forth on the guide sleeve 11 to reciprocate the spool shaft to flatly wind a fishline on the spool 1 by the rotor 2 as it is turned in conjunction with the handle shaft. Since the sleeve 11 is supported by the arc-shaped support portions 17 of the support member 16 having the other support portions 18 fitted in the reel body 6, the cam shaft 7 is smoothly rotated and the concentricity of the sleeve to the cam shaft is kept high enough to enable the slider 5 to smoothly slide on the sleeve.

Figure 5:
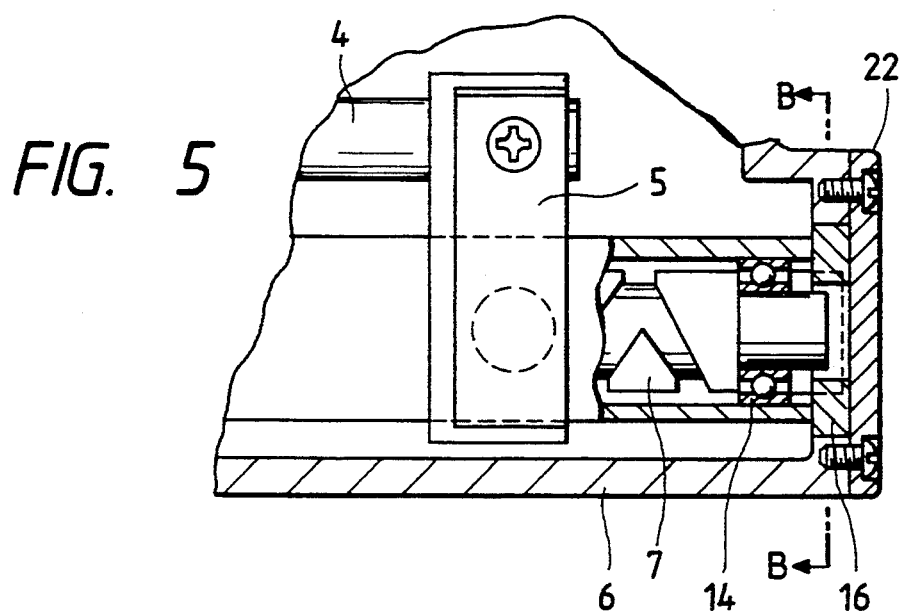
FIG. 5 is a cutaway side view of a part of a fishing reel which is a modification of the embodiment.
Figure 6:
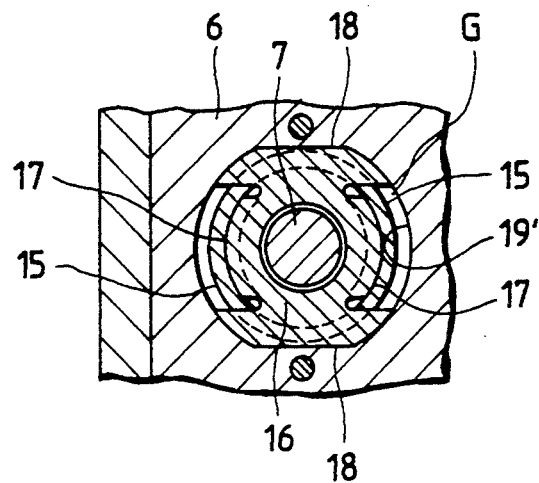
FIG. 6 is a sectional view of the reel along lines B shown in FIG. 5.
Figure 7:
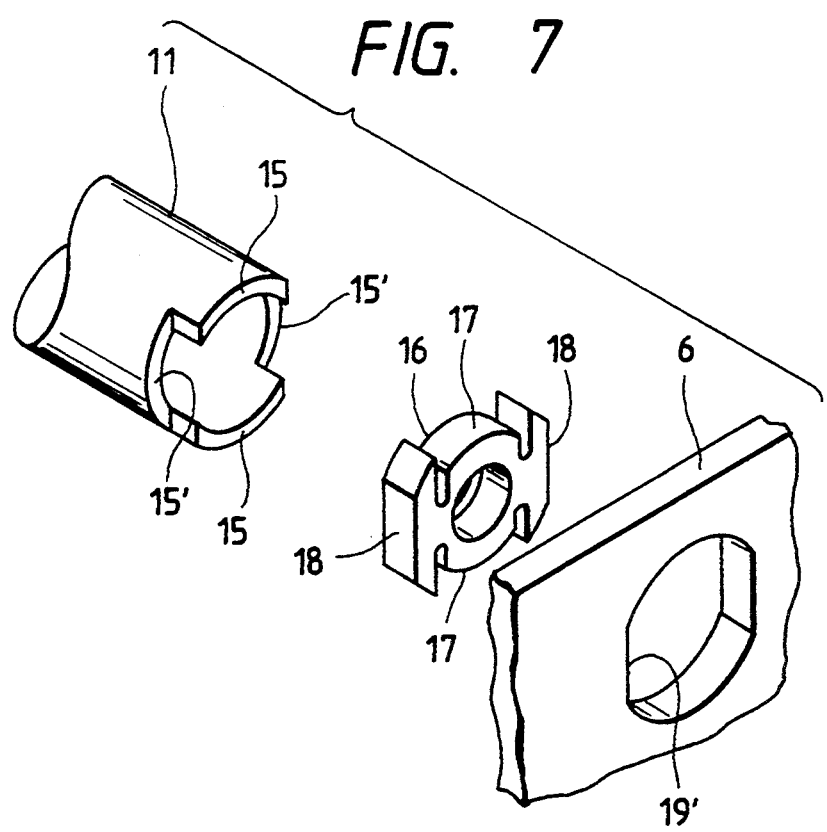
FIG. 7 is an exploded perspective view of a major part of the reel.

FIGS. 5, 6 and 7 show a part of a spinning reel which is a modification of the embodiment. The difference of the reel from the preceding one is that the longitudinal section of each of the fitted support portions 18 of a support member 16 is substantially trapezoidally shaped, and the body 6 of the reel has a support hole 19' shaped as a cut circle to fit the support portions in the hole to put the outer surfaces of the portions on the inner surfaces of the reel body around the hole to prevent the turning of the support member and a guide sleeve 11 without using an engagement member.

Figure 8:
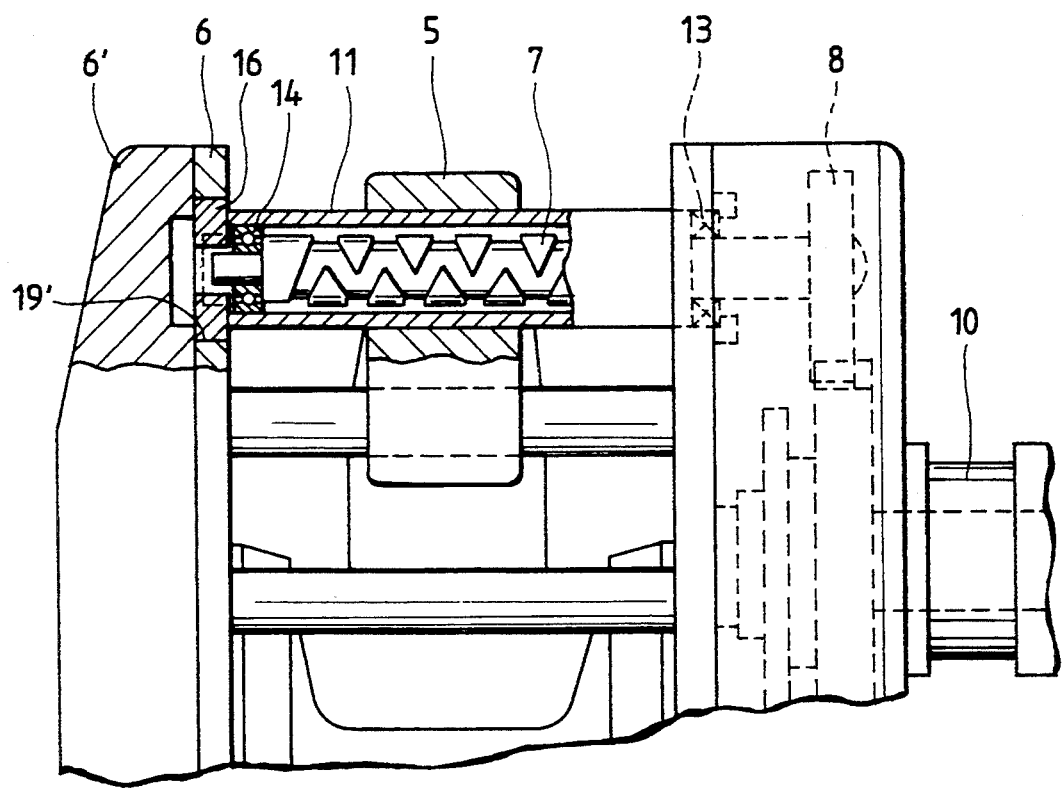
FIG. 8 is a cutaway plan view of a fishing reel which is another embodiment of the invention.

FIG. 8 shows a part of a fishing reel which is another of the embodiments and has a spool shaft supported at both the ends thereof. The reel includes a drive gear, a slider 5, a reel body 6, a reciprocating cam shaft 7, a gear 8, a handle shaft 10, a guide sleeve 11, bearings 13 and 14 and a support member 16. The drive gear is mounted on the handle shaft 10, and engaged with the gear 8 mounted on the reciprocating cam shaft 7. The cam shaft 7 is supported by the bearings 13 and 14 so that the cam shaft can be rotated through the drive gear and the gear 8 in conjunction with the handle shaft 10. The guide sleeve 11 is disposed around the cam shaft 7. The slider 5 has a fishline guide portion, and is engaged in the reciprocating cam groove of the cam shaft 7 and fitted on the sleeve 11 so that the slider can he reciprocated to flatly wind a fishline on the spool of the reel. The sleeve 11 is supported at one end thereof by the support member 16 fitted in the support hole 19' of the reel body 6 so as to be supported by the body, and is supported at the other end of the sleeve by the reel body. The side plate 6' of the body 6 keeps the support member 16 from coming off.

In a fishing reel provided in accordance with the present invention, a reciprocating cam shaft, which is rotated in conjunction with a handle shaft, is disposed in a guide sleeve, and the sleeve is supported by a support member and the body of the reel. The support member includes arc-shaped support portions on which the inner surface of the sleeve is fitted at one end thereof to support the sleeve, and fitted support portions fitted in the body of the reel with a gap between the sleeve and the reel body. As a result, the guide sleeve is surely supported to the reel body in a state that a resistance does not directly act to the reciprocating cam shaft.

Thus, the reciprocating cam shaft can be smoothly rotated. Besides, the concentricity of the guide sleeve to the cam shaft is kept so high that a slider is guided well enough to smoothly and securely slide back and forth in conjunction with the rotation of the cam shaft.

Further, since the side surfaces of the fitted support portion of the support member are made flush with respective side surfaces of the arc-shaped support portion (i.e., the support member has a substantially disk-like shape), the supported portion of the guide sleeve can be located in a parallel, piled relation to the support hole portion of the reel body, thereby reducing the required area or space for support.

Additionally, both ends of the guide sleeve may be supported to the reel body using two support members of the invention.

What is claimed is:

1. A fishing reel in which a guide sleeve is provided around a reciprocating cam shaft, which is rotated in conjunction with a handle shaft; and a slider is coupled to said cam shaft through engagement and fitted on said sleeve so that said slider can be reciprocated, said reel comprising an improvement wherein said sleeve is supported by a body of said reel, using a one-piece support member including arc-shaped support portions on which an inner surface of said sleeve is fitted at one end thereof, and fitted support portions fitted in a support hole of said body, such that a finite circumferential separation is formed between said support portions and said support hole, said separation, support portions and support hole lie in a common plane transverse with respect to said cam shaft.

2. The fishing reel according to the claim 1, wherein said slider has a fishline guide portion for flatly winding a fishline on a spool of said reel.

3. The fishing reel according to claim 1, wherein said support member comprises a first side surface and a second side surface opposite from said first side surface in a longitudinal direction of said sleeve, a length of each of said arc-shaped support portions and said fitted support portions in said longitudinal direction being defined by said first and second side surfaces.

4. The fishing reel according to claim 1, wherein a bearing is interposed between said sleeve and said cam shaft in the vicinity of said support member.

5. The A fishing reel in which a guide sleeve is provided around a reciprocating cam shaft, which is rotated in conjunction with a handle shaft; and a slider is coupled to said cam shaft through engagement and fitted on said sleeve so that said slider can be reciprocated, said reel comprising an improvement wherein said sleeve is supported by a body of said reel, using a one-piece support member including arc-shaped support portions on which an inner surface of said sleeve is fitted at one end thereof, and fitted support portions fitted in a support hole of said body, such that a gap is formed between said sleeve and said support hole, wherein said slider is secured to a spool shaft so as to be reciprocated together with said spool shaft.

6. A fishing reel in which a guide sleeve is provided around a reciprocating cam shaft, which is rotated in conjunction with a handle shaft; and a slider is coupled to said cam shaft through engagement and fitted on said sleeve so that said slider can be reciprocated, said reel comprising an improvement wherein said sleeve is supported by a body of said reel, using a one-piece support member including arc-shaped support portions on which an inner surface of said sleeve is fitted at one end thereof, and fitted support portions fitted in a support hole of said body, such that a spatial gap is formed between said sleeve and said support hole, said spatial gap extending in a radial direction with respect to said cam shaft from said sleeve to said support hole wherein each of said fitted support portions has substantially trapezoidal shape so as to non-rotatably support said guide sleeve to said body.

* * * * *